US012332738B2

(12) United States Patent
Gao et al.

(10) Patent No.: US 12,332,738 B2
(45) Date of Patent: Jun. 17, 2025

(54) MEMORY COMPUTING INTEGRATED DEVICE AND CALIBRATION METHOD THEREOF

(71) Applicant: TSINGHUA UNIVERSITY, Beijing (CN)

(72) Inventors: Bin Gao, Beijing (CN); Peng Yao, Beijing (CN); Huaqiang Wu, Beijing (CN); Jianshi Tang, Beijing (CN); He Qian, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/574,247

(22) PCT Filed: Dec. 13, 2021

(86) PCT No.: PCT/CN2021/137444
§ 371 (c)(1),
(2) Date: Dec. 26, 2023

(87) PCT Pub. No.: WO2023/000586
PCT Pub. Date: Jan. 26, 2023

(65) Prior Publication Data
US 2024/0320083 A1    Sep. 26, 2024

(30) Foreign Application Priority Data

Jul. 21, 2021 (CN) .......................... 202110823220.4

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01)

(58) Field of Classification Search
CPC ........................... G06F 11/073; G06F 11/0793
See application file for complete search history.

(56) References Cited

U.S. PATENT DOCUMENTS 11,138,500 B1 * 10/2021 Mountain .......... G11C 13/0069
2014/0156576 A1 * 6/2014 Nugent ................. G06N 3/049
706/25

(Continued)

FOREIGN PATENT DOCUMENTS

CN        113553293 A     10/2021

*Primary Examiner* — Joshua P Lottich
(74) *Attorney, Agent, or Firm* — Scully, Scott, Murphy & Presser, P.C.

(57) ABSTRACT

A storage and computation integrated apparatus and a calibration method therefor. The storage and computation integrated apparatus includes a first processing unit, which includes: a first computation memristor array; a first calibration memristor array; and a first processing unit. The calibration method includes: determining, by means of off-chip training, a first computation weight matrix which corresponds to a first computation memristor array, and writing the first computation weight matrix into the first computation memristor array; and on the basis of the first computation memristor array where the first computation weight matrix has been written and the first computation weight matrix, performing on-chip training on a first calibration memristor array, so as to adjust a weight value of the first calibration memristor array.

20 Claims, 12 Drawing Sheets

(56) References Cited

U.S. PATENT DOCUMENTS

| | | | |
|---|---|---|---|
| 2014/0347072 A1* | 11/2014 | Herrmann | H01C 10/16 |
| | | | 324/706 |
| 2016/0283842 A1* | 9/2016 | Pescianschi | G06N 3/04 |
| 2018/0031729 A1* | 2/2018 | Maguire-Boyle | G01N 21/85 |
| 2018/0113330 A1* | 4/2018 | Maguire-Boyle | G02F 1/091 |
| 2018/0300618 A1* | 10/2018 | Obradovic | G06N 3/04 |
| 2019/0122105 A1* | 4/2019 | Boybat Kara | G06N 3/048 |
| 2019/0279078 A1* | 9/2019 | Cambou | G06N 3/065 |
| 2020/0118624 A1* | 4/2020 | Giannopoulos | H10N 70/841 |
| 2020/0125936 A1* | 4/2020 | Kataeva | G06N 3/045 |
| 2020/0293855 A1* | 9/2020 | Le Gallo-Bourdeau | |
| | | | G06N 3/084 |
| 2021/0143834 A1* | 5/2021 | Kvatinsky | H03M 1/80 |
| 2021/0201136 A1* | 7/2021 | Chalamalasetti | G11C 11/54 |
| 2022/0148655 A1* | 5/2022 | Syed | G11C 11/5678 |
| 2022/0206750 A1* | 6/2022 | Kahmen | G06G 7/26 |
| 2022/0375520 A1* | 11/2022 | Yi | G11C 7/1006 |

* cited by examiner

MEMORY COMPUTING INTEGRATED DEVICE AND CALIBRATION METHOD THEREOF

CROSS-REFERENCE TO RELATED APPLICATIONS

The present application is a U.S. National Phase Entry under 35 U.S.C. § 371 of PCT International Patent Application No. PCT/CN2021/137444, filed on Dec. 13, 2021, which claims the priority to and benefits of Chinese patent application No. 202110823220.4, filed on Jul. 21, 2021, the entire contents of each of which are incorporated herein by reference as part of the present application.

TECHNICAL FIELD

The present disclosure relates to a memory computing integrated device and calibration method thereof.

BACKGROUND

A memory computing integrated device based on memristor can directly perform operations such as in-situ multiplication and accumulation at a storage location, realize device-level integration of computing and storage, and break the limitation of computing power and energy efficiency of traditional hardware platforms, which is one of the most potential next-generation hardware chip technologies. Enterprises and scientific research units at home and abroad have invested a lot of manpower and material resources. After nearly ten years of development, the memory computing integrated technology based on memristors has gradually entered the prototype demonstration stage of actual chips and systems from the theoretical simulation stage.

SUMMARY

At least one embodiment of the present disclosure provides a calibration method of a memory computing integrated device, the memory computing integrated device comprises a first processing element, the first processing element comprises a first calculation memristor array and a first calibration memristor array, and the first calculation memristor array is configured to receive a first calculation input data and calculate the first calculation input data to obtain a first output data; the first calibration memristor array is configured to receive a first calibration input data and calibrate the first output data according to the first calibration input data to obtain a first calibration output data; the first processing element is configured to output the first calibration output data, the calibration method comprises: determining a first calculation weight matrix corresponding to the first calculation memristor array through off-chip training, and writing the first calculation weight matrix into the first calculation memristor array; based on the first calculation memristor array written with the first calculation weight matrix and the first calculation weight matrix, performing on-chip training on the first calibration memristor array to adjust a weight value of the first calibration memristor array.

For example, in the calibration method provided by at least one embodiment of the present disclosure, the first calculation memristor array comprises M rows by N columns of memristor sub-circuits, the first calibration memristor array comprises K rows by N columns of memristor sub-circuits, the i-th column of the first calibration memristor array is connected in series with the i-th column of the first calculation memristor array, a memristor sub-circuit of the i-th column of the first calibration memristor array is configured to calibrate the first output data of the i-th column of the first calculation memristor array according to the first calibration input data to obtain the first calibration output data of the i-th column, M, N, K and i are all positive integers, and $1 \leq i \leq N$, based on the first calculation memristor array written with the first calculation weight matrix and the first calculation weight matrix, performing on-chip training on the first calibration memristor array to adjust the weight value of the first calibration memristor array comprises: determining a first training target output data according to a first training calculation input data and the first calculation weight matrix; inputting the first training calculation input data to the first calculation memristor array and inputting a first training calibration input data to the first calibration memristor array to obtain a first training calibration output data; according to a deviation between the first training calibration output data and the first training target output data, adjust the weight value of the memristor sub-circuit in the first calibration memristor array corresponding to a column that need calibration in the first calculation memristor array.

For example, in the calibration method provided by at least one embodiment of the present disclosure, the first calibration memristor array comprises a fixed bias calibration sub-array, the first training calibration input data comprises a fixed training calibration input data, and the fixed bias calibration sub-array comprises one row by N columns of memristor sub-circuits, inputting the first training calibration input data to the first calibration memristor array comprises: inputting the fixed training calibration input data to the fixed deviation calibration sub-array.

For example, in the calibration method provided by at least one embodiment of the present disclosure, the first calibration memristor array comprises a dynamic deviation calibration sub-array, the first training calibration input data comprises a dynamic training calibration input data, and the dynamic deviation calibration sub-array comprises at least one row by N columns of memristor sub-circuits, inputting the first training calibration input data to the first calibration memristor array comprises: determining the dynamic training calibration input data according to the first training calculation input data, and inputting the dynamic training calibration input data to the dynamic deviation calibration sub-array.

For example, in the calibration method provided by at least one embodiment of the present disclosure, the first calibration memristor array comprises a fixed deviation calibration sub-array and a dynamic deviation calibration sub-array, the first training calibration input data comprises a fixed training calibration input data and a dynamic training calibration input data, the fixed deviation calibration sub-array comprises one row by N columns of memristor sub-circuits, and the dynamic deviation calibration sub-array comprises at least one row by N columns of memristor sub-circuits, inputting the first training calibration input data to the first calibration memristor array comprises: inputting the fixed training calibration input data to the fixed deviation calibration sub-array; determining the dynamic training calibration input data according to the first training calculation input data; and inputting the dynamic training calibration input data to the dynamic deviation calibration sub-array.

For example, in the calibration method provided by at least one embodiment of the present disclosure, inputting the fixed training calibration input data to the fixed deviation calibration sub-array comprises: inputting 5%-20% of a maximum value of the first training calculation input data to the fixed deviation calibration sub-array as the fixed training calibration input data.

For example, in the calibration method provided by at least one embodiment of the present disclosure, before performing on-chip training on the first calibration memristor array based on the first calculation memristor array written with the first calculation weight matrix and the first calculation weight matrix to adjust the weight value of the first calibration memristor array, the calibration method further comprises: determining at least one memristor sub-circuit in the i-th column of the first calculation memristor array at a key weight position, and setting an input of at least one memristor sub-circuit in the i-th column of the dynamic deviation calibration sub-array to be the same as an input of the at least one memristor sub-circuit in the i-th column of the first calculation memristor array at the key weight position, determining the dynamic training calibration input data according to the first training calculation input data comprises: taking the first training calculation input data of the at least one memristor sub-circuit in the i-th column of the first calculation memristor array at the key weight position as the dynamic training calibration input data of at least one memristor sub-circuit in the i-th column of the dynamic deviation calibration sub-array.

For example, in the calibration method provided by at least one embodiment of the present disclosure, before performing on-chip training on the first calibration memristor array based on the first calculation memristor array written with the first calculation weight matrix and the first calculation weight matrix to adjust the weight value of the first calibration memristor array, the calibration method further comprises: determining at least one row of the memristor sub-circuit of the first calculation memristor array at a key weight position, and setting an input of at least one row of the memristor sub-circuit of the dynamic deviation calibration sub-array to be the same as an input of the at least one row of the memristor sub-circuit of the first calculation memristor array at the key weight position, determining the dynamic training calibration input data according to the first training calculation input data comprises: taking the first training calculation input data of the at least one row of the memristor sub-circuit of the first calculation memristor array at the key weight position as the dynamic training calibration input data of at least one row of the memristor sub-circuit in the dynamic deviation calibration sub-array.

For example, in the calibration method provided by at least one embodiment of the present disclosure, based on the first calculation memristor array written with the first calculation weight matrix and the first calculation weight matrix, performing on-chip training on the first calibration memristor array to adjust the weight value of the first calibration memristor array further comprises: before inputting the first training calculation input data to the first calculation memristor array and inputting the first training calibration input data to the first calibration memristor array to obtain the first training calibration output data, inputting the first training calculation input data to the first calculation memristor array to obtain the first training output data; according to the deviation between the first training output data and the first training target output data, determining the column that need calibration in the first calculation memristor array, and connecting the memristor sub-circuit in the first calibration memristor array corresponding to the column that need calibration in series with the column that need calibration in the first calculation memristor array.

For example, in the calibration method provided by at least one embodiment of the present disclosure, the memory computing integrated device further comprises a second processing element, the second processing element comprises a second calculation memristor array and a second calibration memristor array, and the second calculation memristor array is configured to receive a second calculation input data determined according to the first calibration output data and calculate the second calculation input data to obtain a second output data; the second calibration memristor array is configured to receive the second calibration input data and calibrate the second output data according to the second calibration input data to obtain a second calibration output data; the second processing element is configured to output the second calibration output data; the calibration method further comprises: determining a second calculation weight matrix corresponding to the second calculation memristor array through off-chip training, and writing the second calculation weight matrix into the second calculation memristor array; based on the second calculation memristor array written with the second calculation weight matrix and the second calculation weight matrix, performing on-chip training on the second calibration memristor array to adjust a weight value of the second calibration memristor array.

For example, in the calibration method provided by at least one embodiment of the present disclosure, the second processing element is coupled with the first processing element, in the process of on-chip training the second calibration memristor array based on the second calculation memristor array written with the second calculation weight matrix and the second calculation weight matrix to adjust the weight value of the second calibration memristor array, determining the first training target output data according to the first training calculation input data and the first calculation weight matrix, and taking the first training target output data as the second training input data of the second calculation memristor array, or, under the condition that the first calibration memristor array is trained, inputting the first training calculation input data to the first calculation memristor array, inputting the first training calibration input data to the first calibration memristor array to obtain the first training calibration output data, and taking the first training calibration output data as the second training input data of the second calculation memristor array.

For example, in the calibration method provided by at least one embodiment of the present disclosure, each memristor sub-circuit in the first calibration memristor array is configured to realize both positive weight and negative weight.

At least one embodiment of the present disclosure further provides a memory computing integrated device, comprising a first processing element, wherein the first processing element comprises a first calculation memristor array and a first calibration memristor array, the first calculation memristor array is configured to receive a first calculation input data and calculate the first calculation input data to obtain a first output data; the first calibration memristor array is configured to receive a first calibration input data and calibrate the first output data according to the first calibration input data to obtain a first calibration output data; the first processing element is configured to output the first calibration output data.

For example, in the memory computing integrated device provided by at least one embodiment of the present disclosure, the first calculation memristor array comprises M rows by N columns of memristor sub-circuits, the first calibration memristor array comprises K rows by N columns of memristor sub-circuits, the i-th column of the first calibration memristor array is connected in series with the i-th column of the first calculation memristor array, the memristor sub-circuit of the i-th column of the first calibration memristor array is configured to calibrate the first output data of the i-th column of the first calculation memristor array according to the first calibration input data to obtain the first calibration output data of the i-th column, M, N, K and i are all positive integers, and $1 \le i \le N$.

For example, in the memory computing integrated device provided by at least one embodiment of the present disclosure, the first calibration memristor array comprises a fixed deviation calibration sub-array, the first calibration input data comprises a fixed calibration input data, the fixed deviation calibration sub-array comprises one row by N columns of memristor sub-circuits, the i-th column of the fixed deviation calibration sub-array is connected in series with the i-th column of the first calculation memristor array, the memristor sub-circuit in the i-th column of the fixed deviation calibration sub-array is configured to calibrate the first output data of the i-th column of the first calculation memristor array according to the fixed calibration input data to obtain the first calibration output data of the i-th column.

For example, in the memory computing integrated device provided by at least one embodiment of the present disclosure, the first calibration memristor array comprises a dynamic deviation calibration sub-array, the first calibration input data comprises a dynamic calibration input data, and the dynamic deviation calibration sub-array comprises at least one row by N columns of memristor sub-circuits, and the i-th column of the dynamic deviation calibration sub-array is connected in series with the i-th column of the first calculation memristor array, the dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, the at least one memristor sub-circuit in the i-th column of the dynamic deviation calibration sub-array is configured to calibrate the first output data of the i-th column of the first calculation memristor array according to the dynamic calibration input data corresponding to the at least one memristor sub-circuit in the i-th column of the dynamic deviation calibration sub-array to obtain the first calibration output data of the i-th column.

For example, in the memory computing integrated device provided by at least one embodiment of the present disclosure, the first calibration memristor array comprises a fixed deviation calibration sub-array and a dynamic deviation calibration sub-array, the first calibration input data comprises a fixed calibration input data and a dynamic calibration input data, the fixed deviation calibration sub-array comprises one row by N columns of memristor sub-circuits, and the dynamic deviation calibration sub-array comprises at least one row by N columns of memristor sub-circuits, the i-th column of the fixed deviation calibration sub-array and the i-th column of the dynamic deviation calibration sub-array are connected in series with the i-th column of the first calculation memristor array, the dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, the memristor sub-circuit of the i-th column of the fixed deviation calibration sub-array and the at least one memristor sub-circuit of the i-th column of the dynamic deviation calibration sub-array are configured to calibrate the first output data of the i-th column of the first calculation memristor array according to the fixed calibration input data and the dynamic calibration input data corresponding to the at least one memristor sub-circuit of the i-th column of the dynamic deviation calibration sub-array respectively, so as to obtain the first calibration output data of the i-th column.

For example, in the memory computing integrated device provided by at least one embodiment of the present disclosure, the fixed calibration input data is 5%-20% of a maximum value of the first calculation input data.

For example, in the memory computing integrated device provided by at least one embodiment of the present disclosure, the dynamic calibration input data corresponding to the at least one memristor sub-circuit in the i-th column of the dynamic deviation calibration sub-array is the same as the first calculation input data corresponding to the at least one memristor sub-circuit in the i-th column of the first calculation memristor array at the key weight position.

For example, in the memory computing integrated device provided by at least one embodiment of the present disclosure, the dynamic calibration input data corresponding to at least one row of memristor sub-circuit in the dynamic deviation calibration sub-array is the same as the first calculation input data corresponding to at least one row of memristor sub-circuit in the first calculation memristor array at the key weight position.

BRIEF DESCRIPTION OF DRAWINGS

In order to more clearly explain the technical scheme of the embodiments of the present disclosure, the attached drawings of the embodiments will be briefly introduced below. Obviously, the attached drawings in the following description only relate to some embodiments of the present disclosure, and are not limited to the present disclosure.

DETAILED DESCRIPTION

Figure 1:
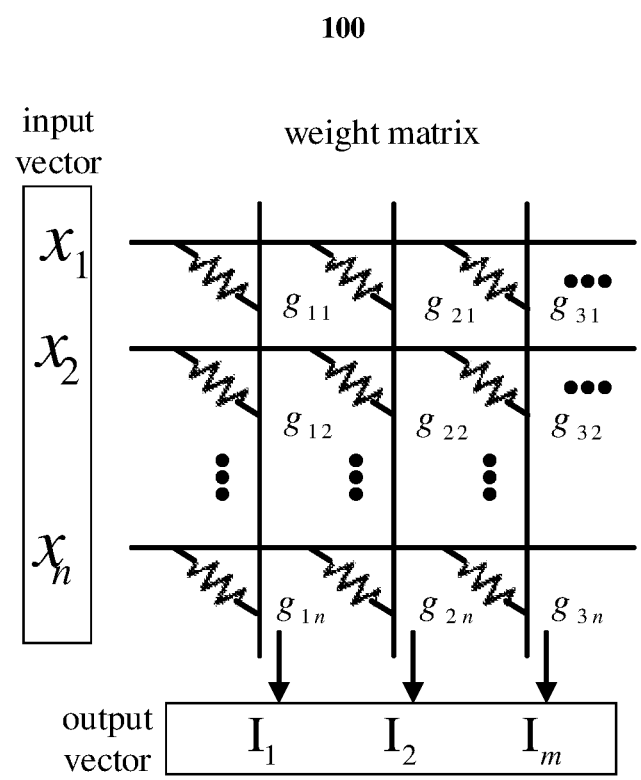
FIG. 1 illustrates a schematic diagram of a memristor cross array structure.

In order to make the purpose, technical scheme and advantages of the embodiment of the disclosure more clear, the technical scheme of the embodiment of the disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in this disclosure shall have their ordinary meanings as understood by people with ordinary skills in the field to which this disclosure belongs. The terms "first", "second" and the like used in this disclosure do not indicate any order, quantity or importance, but are only used to distinguish different components. Similarly, similar words such as "a", "an" or "the" do not indicate a quantity limit, but indicate the existence of at least one. Similar words such as "including" or "containing" mean that the elements or objects appearing before the word cover the elements or objects listed after the word and their equivalents, without excluding other elements or objects. Similar words such as "connected" or "connected" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

Hereinafter, the present disclosure will be explained by several specific embodiments. In order to keep the following description of the embodiments of the present disclosure clear and concise, detailed descriptions of known functions and known components may be omitted. When any component of an embodiment of the present disclosure appears in more than one drawing, the component is represented by the same reference numeral in each drawing.

Memristor cross array structure is the core of analog domain calculation of memristor memory computing integrated device. For example, FIG. 1 illustrates a schematic diagram of a memristor cross array structure 100. As illustrated by FIG. 1, a memristor cross array structure 100 may include a plurality of memristors arranged in a horizontal and vertical cross manner. By arranging an input data as an input vector X (for example, including $x_1, x_2, \ldots, x_n$, illustrated by FIG. 1, and the input vector may be a voltage with an encoded amplitude, width or pulse number), an weight matrix is encoded as a memristor conductance value G (for example, including $g_{11}, g_{21}, \ldots, g_{1n}$ illustrated by FIG. 1, and $g_{m1}, g_{m2}, \ldots, g_{mn}$ not illustrated by FIG. 1), an output current I (for example, including $I_1, I_2, \ldots, I_m$ illustrated by FIG. 1) is obtained by using an array read operation with high parallelism and low power consumption which can realize the common multiplication and accumulation calculation in deep learning, and further accelerate the matrix vector multiplication. For example, according to Kirchhoff's law, the output current of the memristor cross array structure can be obtained according to the following formula: $I=G \times V$. The above multiplication and accumulation calculation process is realized in the analog domain by using physical laws, which is different from a digital circuit implementation of Boolean logic, it does not need to frequently access, store and move a weight data, which solves the Von Neumann bottleneck of the classical calculation system and can realize the intelligent calculation task with high calculation power and energy efficiency.

Figure 2:
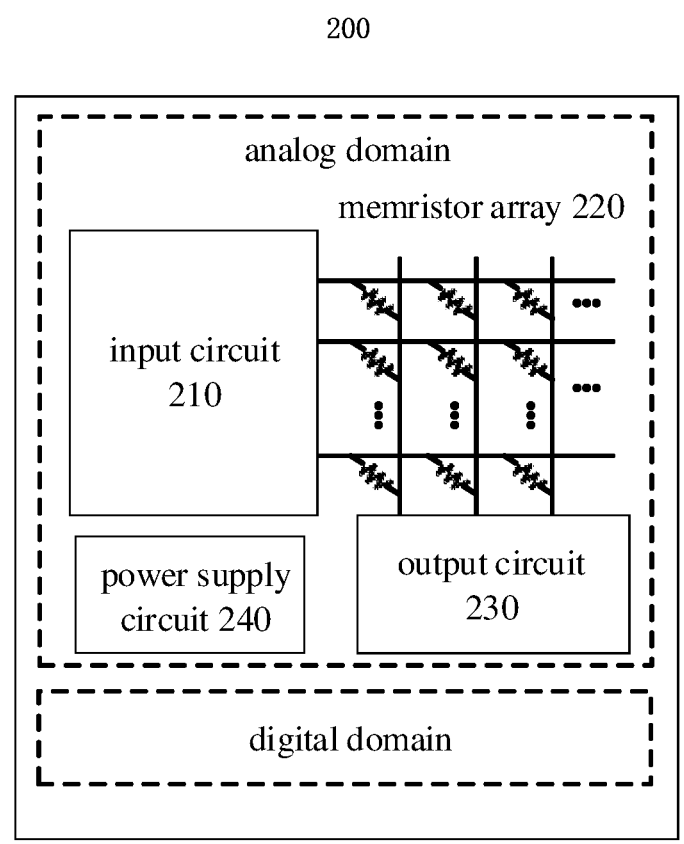
FIG. 2 illustrates a schematic diagram of a processing element of a memory computing integrated device.

An memristor cross array can be used to construct a basic processing element (PE) of the memory computing integrated device. For example, FIG. 2 illustrates a schematic diagram of a processing element 200 of the memory computing integrated device. As illustrated by FIG. 2, the processing element 200 can include an analog domain part and a digital domain part, the analog domain part realizes analog calculation based on an analog signal, and input, control and output signals of the analog domain are all digital signals; the digital domain part controls and cooperates with the functions of the analog domain part, and interacts with the outside. For example, as illustrated by FIG. 2, the analog domain part includes an input circuit 210, a memristor array 220, an output circuit 230 and a power supply circuit 240. The input circuit 210 is an analog circuit used to realize the function of inputting vector; the memristor array 220 is a memristor cross array (for example, the memristor cross array structure 100 illustrated by FIG. 1), which can be written into a weight matrix and carry out multiply accumulate calculation; the output circuit 230 is an analog circuit for quantizing an output vector (such as the output current illustrated by FIG. 1); the power supply circuit 240 is a basic analog power supply circuit. For example, the digital domain part may include a controller, an input buffer, an output buffer, a digital post-processing circuit, an interface circuit and the like (not illustrated by FIG. 1). It should be noted that the processing element 200 illustrated by FIG. 1 is only exemplary, and is not a limitation of the present disclosure, and the processing element can add, subtract and deform circuits according to the actual situation.

Figure 3:
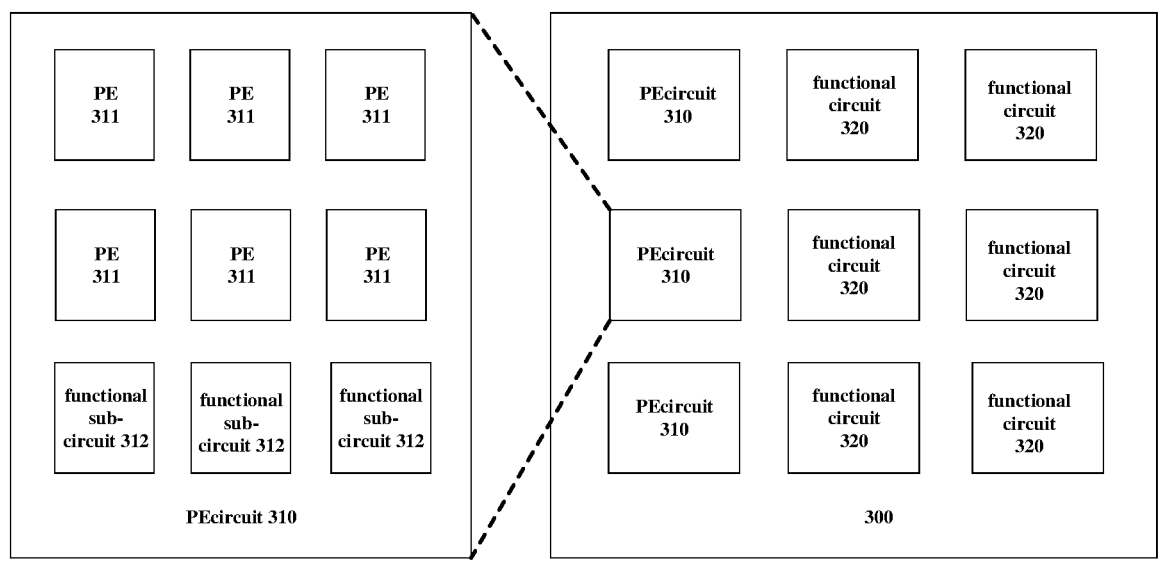
FIG. 3 illustrates a schematic diagram of a memory computing integrated system based on a memristor.

FIG. 3 illustrates a schematic diagram of a memory computing integrated system 300 based on a memristor. For example, the memory computing integrated system 300 may be a memory computing integrated chip. As illustrated by FIG. 3, the memory computing integrated system 300 includes a plurality of processing element circuits 310 and a plurality of functional circuits 320. As illustrated by FIG. 3, each processing element circuit 310 includes a plurality of processing elements 311 and a plurality of functional sub-circuits 312, for example, the processing element 311 may be the processing element 200 illustrated by FIG. 2, and the plurality of functional sub-circuits 312 are implemented by a digital circuit and may include one or more of the following: an interconnection circuit, an interface circuit, a control circuit and the like. For example, the plurality of functional units 320 are realized by a digital circuit and may include one or more of the following: an interconnection unit, a main control unit, an on-chip storage unit, a routing unit, an interface unit, a clock unit, a power supply unit and the like. It should be noted that the memory computing integrated system 300 illustrated by FIG. 3 is only exemplary, and is not a limitation of the present disclosure, and the memory computing integrated system can add, subtract and deform circuits according to actual conditions. In the memory computing integrated system based on the memristor, all the signal processing and control in digital domain are very stable, but the analog calculation in analog domain may be affected by the natural randomness, non-ideal characteristics and array parasitic parameters of the memristor, or by environmental deviations and fluctuations such as process, power supply and temperature, so that it will deviate from the ideal function and output when working at device level (the memristor), circuit level (the analog circuit module), array level and system level. These errors, noises and so on will cause the accuracy loss and errors of the calculation results, which will make the hardware system unable to work correctly. For example, if each processing element 311 illustrated by FIG. 3 is the processing element 200 illustrated by FIG. 2, there will be errors and disturbances in the input circuit, memristor array, output circuit and power supply circuit in each processing element 311, and the memory computing integrated system based on the memristor illustrated by FIG. 3 includes multiple processing elements 311, and the errors and disturbances will accumulate continuously, thus seriously affecting the normal operation of the system. At this time, calibration is needed.

Figure 4A:
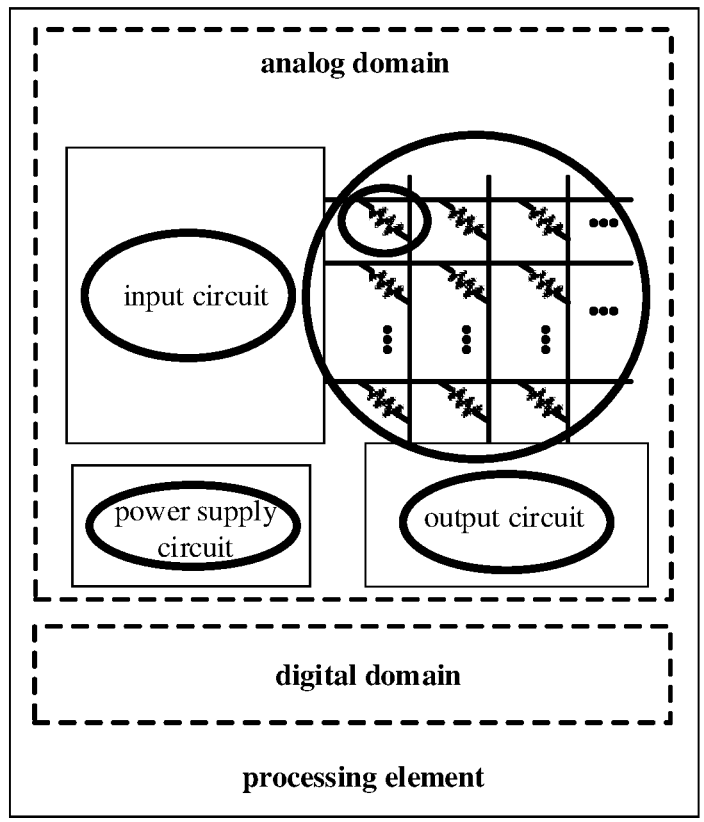
FIG. 4A illustrates a schematic diagram of a low-level and fine-grained component-level calibration method.
Figure 4B:
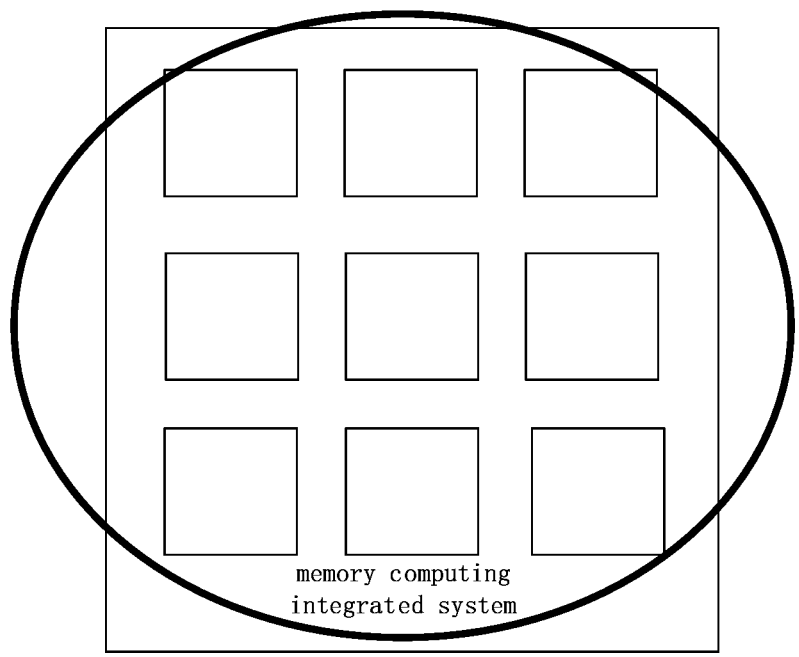
FIG. 4B illustrates a schematic diagram of a high-level and coarse-grained system-level calibration method.
Figure 4C:
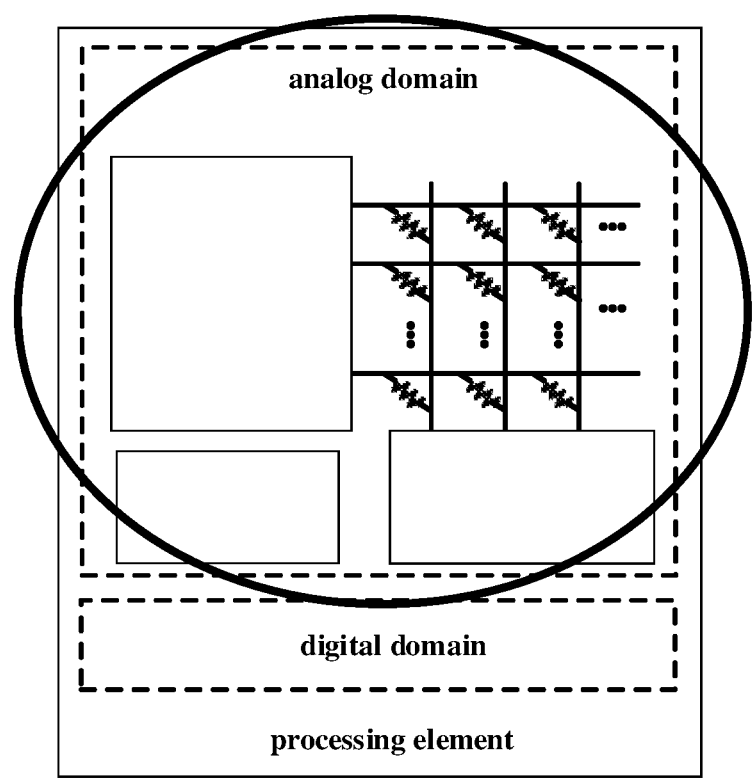
FIG. 4C is a schematic diagram of a middle-level and medium-grained calibration method for intermediate-level components provided by an embodiment of the present disclosure.

For example, FIGS. 4A-4C illustrate schematic diagrams of a calibration method. Traditional calibration methods can be divided into two categories. A first kind of calibration method is low-level and fine-grained component-level calibration, which ensures that each component works reliably and accurately by calibrating all potential sources of errors and fluctuations, thus ensuring that the system including multiple components can work reliably and accurately. For example, multiple memristors are used to represent a weight sub-circuit together, and use an average effect to offset the influence of randomness; design a brand-new sub-circuit array structure to alleviate the parasitic parameters of the array; increase the circuit design dimension in equal proportion to alleviate the process deviation; introduce the calibration circuit unit to compensate and calibrate the accuracy of analog circuits. For example, FIG. 4A illustrates a schematic diagram of a low-level, fine-grained component-level calibration method, in which a black circle indicates a calibration position. In FIG. 4A, each sub-circuit in the analog domain of the processing element is calibrated, thus ensuring that the processing element can work reliably and accurately, and further ensuring that the system including multiple processing elements can work reliably and accurately. A second kind of calibration method is high-level and coarse-grained system-level calibration. in the second kind of solution, the specific error and fluctuation sources are not concerned, but the work and output correctness of the system function level are emphasized from the overall performance of the system. For example, the algorithm and the system are combined for joint optimization, the weight of a key layer or all weights are trained on the chip, the integrated learning method is adopted, and more hardware resources are used to realize the same algorithm. For example, FIG. 4B illustrates a schematic diagram of a high-level and coarse-grained system-level calibration method, in which a black circle indicates a calibration position. In FIG. 4B, the memory computing integrated system based on the memristor is calibrated through algorithm optimization and process improvement. However, the first kind of calibration method is expensive, costly and complicated in design and implementation. The second kind of calibration method usually requires higher device characteristics, and the calibration reliability is difficult to guarantee. It can only prove that it works in a limited network structure and cannot be extended to a wider and more complex network model. In addition, some specific second kind of calibration methods can only be compatible with device-level errors, and if the ensemble learning method is adopted, the hardware overhead will be doubled.

In order to realize a highly reliable and low-cost error calibration of universal memory computing integrated analog calculation, the present disclosure proposes a calibration method with middle-level and medium-grained for intermediate-level components. In the middle-level and medium-grained calibration method for intermediate-level components provided by the present disclosure, a redundant calibration unit is introduced to calibrate the analog domain calculation results of intermediate-level components, thus ensuring that the system can work reliably and accurately; and because only the introduced redundant calibration units are adjusted without changing the weight matrix realized by the existing memristor array, the hardware overhead can be flexibly configured according to the requirements of calibration accuracy, and the on-demand design can be realized. For example, FIG. 4C is a schematic diagram of a middle-level and medium-grained calibration method for intermediate-level components provided by an embodiment of the present disclosure, in which a black circle indicates a calibration position. In FIG. 4C, the analog domain calculation results of each processing element are calibrated, and because the errors of various bottom-level analog components are eventually reflected in the simulation calculation result, calibrating the analog domain calculation results is equivalent to calibrating all bottom-level analog components at the same time, which can ensure the accuracy of each calculation result at the processing element level, thus ensuring the normal work of the system.

Hereinafter, the middle-level and medium-grained calibration method for intermediate-level components, its embodiments and corresponding examples provided by the present disclosure will be described in detail with reference to the accompanying drawings.

Figure 5:
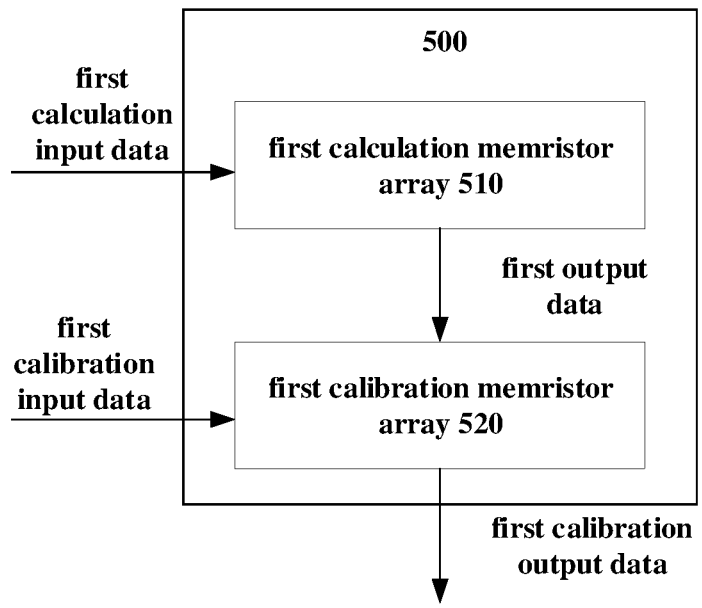
FIG. 5 is a schematic diagram of a processing element of a memory computing integrated device provided by an embodiment of the present disclosure.
Figure 6:
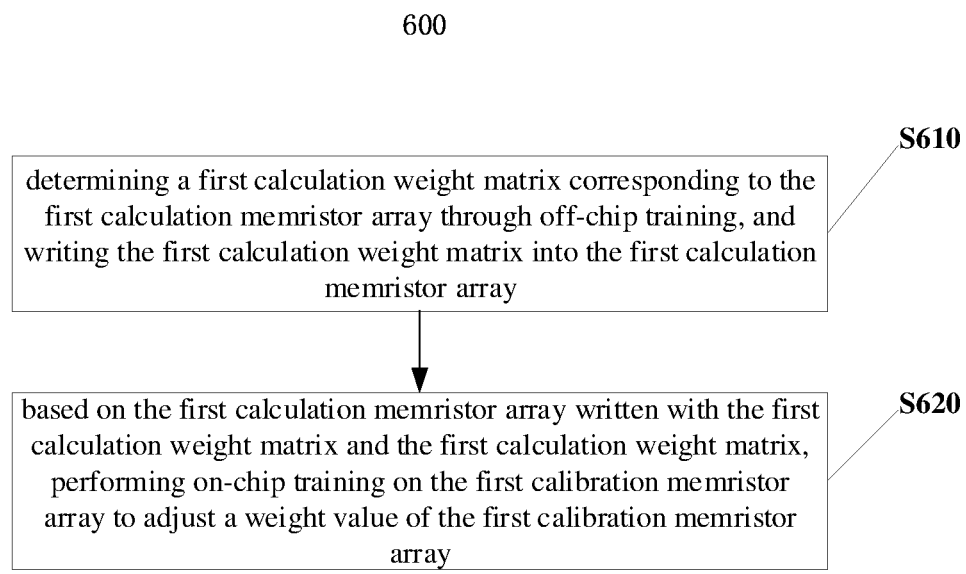
FIG. 6 is a flowchart of a calibration method of a memory computing integrated device provided by an embodiment of the present disclosure.

FIG. 5 is a schematic diagram of a processing element of a memory computing integrated device provided by an embodiment of the present disclosure. FIG. 6 is a flowchart of a calibration method of a memory computing integrated device provided by an embodiment of the present disclosure. Hereinafter, the calibration method illustrated by FIG. 6 will be described in detail, taking the memory computing integrated device illustrated by FIG. 5 as an example.

For example, as illustrated by FIG. 5, the memory computing integrated device includes a first processing element 500, which includes a first calculation memristor array 510 and a first calibration memristor array 520, and the first calculation memristor array 510 is configured to receive a first calculation input data and calculate the first calculation input data to obtain a first output data; the first calibration memristor array 520 is configured to receive a first calibration input data and calibrate the first output data according to the first calibration input data to obtain a first calibration output data; the first processing element 500 is configured to output the first calibration output data.

For example, the first calculation memristor array 510 may be a memristor array 220 illustrated by FIG. 2. The first calculation input data can be an encoded voltage, and the first calculation memristor array 510 performs multiply accumulate calculation to obtain the first output data, which is a current value.

For example, the first calibration memristor array 520 may be a memristor cross array, the first calibration input data may be an encoded voltage, and the first calibration memristor array 520 may calibrate fixed bias deviation and dynamic deviation of the first output data.

It should be noted that, for the sake of clarity, FIG. 5 only schematically illustrates the first processing element 500 of the memory computing integrated device, and only illustrates partial components of the first processing element 500. In fact, the memory computing integrated device may include a plurality of basic processing elements similar to the first processing element 500 and other possible components (for example, the functional circuit 320 illustrated by FIG. 3), and the first processing element 500 may further include other possible components (for example, various analog circuits illustrated by FIG. 2).

In this case, for example, as illustrated by FIG. 6, the calibration method 600 includes step S610 and step S620.

Step S610: determining a first calculation weight matrix corresponding to the first calculation memristor array 510 through off-chip training, and writing the first calculation weight matrix into the first calculation memristor array 510.

Step S620: based on the first calculation memristor array 510 written with the first calculation weight matrix and the first calculation weight matrix, performing on-chip training on the first calibration memristor array 520 to adjust a weight value of the first calibration memristor array 520.

For step S610, the first calculation weight matrix may be encoded as a conductance value of the first calculation memristor array.

For step S620, a calculation output of the first calculation memristor array 510 written with the first calculation weight matrix can be regarded as the actual first output data, and an ideal target output data can be determined by using the first calculation weight matrix. There is a deviation between the actual first output data and the ideal target output data. The first calibration memristor array 520 is trained on chip, and the deviation can be reduced by adaptively adjusting the weight value of the first calibration memristor array 520 until the deviation reaches a suitable interval, thus achieving the purpose of calibration.

For example, the calibration method 600 can be integrated into a tool chain such as a compiler of the system to realize the whole process automation. In this case, only the first calibration memristor array 520 and a simple digital control circuit (not illustrated by FIG. 5) are introduced as additional hardware overhead.

For example, on-chip training can adopt a linear regression method or other algorithm to adjust the weight value of the first calibration memristor array 520, so that the actual first output data approaches the ideal target output data, so as to achieve the calibration effect.

For example, an order of adjusting the weight value of the first calibration memristor array 520 can be in a parallel mode or a serial mode, and other possible sequential mode can be adopted, which is not limited by the embodiment of the present disclosure. For example, the operation of adjusting the weight value of the first calibration memristor array 520 may be an accurate quantitative update with read check, a qualitative sign update, or other operation mode that can ensure that the weight is increased or decreased as required, which is not limited by the embodiment of the present disclosure.

In the embodiment of the present disclosure, the calibration of the first output data of the first calculation memristor array is actually the calibration of the analog domain calculation results in the first processing element, and the first output data already contains the deviation caused by the first calculation memristor array and other possible analog circuits (for example, various analog circuits illustrated by FIG. 2) in the first processing element, so that the above calibration is the calibration at the processing element level, which can ensure the accuracy of the analog domain calculation results of each processing element, thus ensuring the normal work of the system including multiple processing elements, and has good reliability and universality. In addition, because there is no need to calibrate each component at the bottom, the additional overhead introduced is low, which has the advantages of high efficiency and low cost; because only the weight value of the first calibration memristor array is calibrated, the hardware overhead can be flexibly configured according to the requirements of calibration accuracy, and the on-demand design can be realized. Therefore, the calibration method proposed in the present disclosure solves the key bottleneck of the development of the memory computing integrated system, and is the core breakthrough of the memory computing integrated technology of the memristor towards the practical application stage.

For example, in the calibration method provided by at least one embodiment of the present disclosure, the first calculation memristor array 510 includes M rows by N columns of memristor sub-circuits, the first calibration memristor array 520 includes K rows by N columns of memristor sub-circuits, the i-th column of the first calibration memristor array 520 is connected in series with the i-th column of the first calculation memristor array 510, the memristor sub-circuit of the i-th column of the first calibration memristor array 520 is configured to calibrate the first output data of the i-th column of the first calculation memristor array 510 according to the first calibration input data to obtain the first calibration output data of the i-th column, M, N, K and i are all positive integers, and $1 \leq i \leq N$.

It should be noted that a dimension of the first calibration memristor array 520 is determined by the requirement of calibration accuracy. The more accurate the simulation calculation result and the larger the calibration range, the more redundant weights are needed, that is to say, the larger the dimension of the first calibration memristor array 520 is needed. In an extreme case, the dimension of the first calibration memristor array 520 may be larger than the dimension of the first calculation memristor array 510.

It should also be noted that the words "row" and "column" used in describing the dimensions of the first calculation memristor array 510 and the first calibration memristor array 520 are only intended to distinguish two dimensions of the memristor array, and are not limitations to the memristor array.

For example, in the calibration method provided by at least one embodiment of the present disclosure, step S620 includes steps S621 to S623.

Step S621: determining a first training target output data according to a first training calculation input data and the first calculation weight matrix.

Step S622: inputting the first training calculation input data to the first calculation memristor array 510 and inputting a first training calibration input data to the first calibration memristor array 520 to obtain a first training calibration output data.

Step S623: according to a deviation between the first training calibration output data and the first training target output data, adjust the weight value of the memristor sub-circuit in the first calibration memristor array corresponding to the column that need calibration in the first calculation memristor array.

In step S621, the first training input data is input to the first calculation memristor array 510, and the first calculation memristor array 510 can calculate the first training target output data according to the first calculation weight matrix.

For example, the first training input data may be generated randomly, or generated by sampling according to the input distribution of a training set predetermined by a tool chain such as a compiler, or directly be a part of the training set predetermined by a tool chain such as a compiler, and the embodiment of the present disclosure does not limit thereto.

For step S622, under the condition that the first training calculation input data is input to the first calculation memristor array 510 and the first training calibration input data is input to the first calibration memristor array 520, the whole of the first calculation memristor array 510 and the first calibration memristor array 520 can calculate the first training calibration output data.

For step S623, according to the deviation between the first training calibration output data and the first training target output data, only the weight value of the memristor sub-circuit in the first calibration memristor array 520 corresponding to the column that need calibration in the first calculation memristor array 510 are adjusted, and the deviation can be calibrated without adjusting the weight value of the memristor sub-circuit in the column that need calibration in the first calculation memristor array 510.

For example, each memristor sub-circuit in the first calibration memristor array 510 is configured to realize both positive weight and negative weight.

It should be noted that the above-mentioned embodiment schematically illustrates one iterative process of on-chip training of the first calibration memristor array. In actual situation, it is usually necessary to carry out multiple iterative processes to make the calibration result meet the requirement. Because each iterative process in the multiple iterative processes is the same as steps S621 to S623, it is not repeated here.

It should also be noted that in order to prevent too many iteration processes, a maximum number of iteration processes can be set to save resources.

Figure 7:
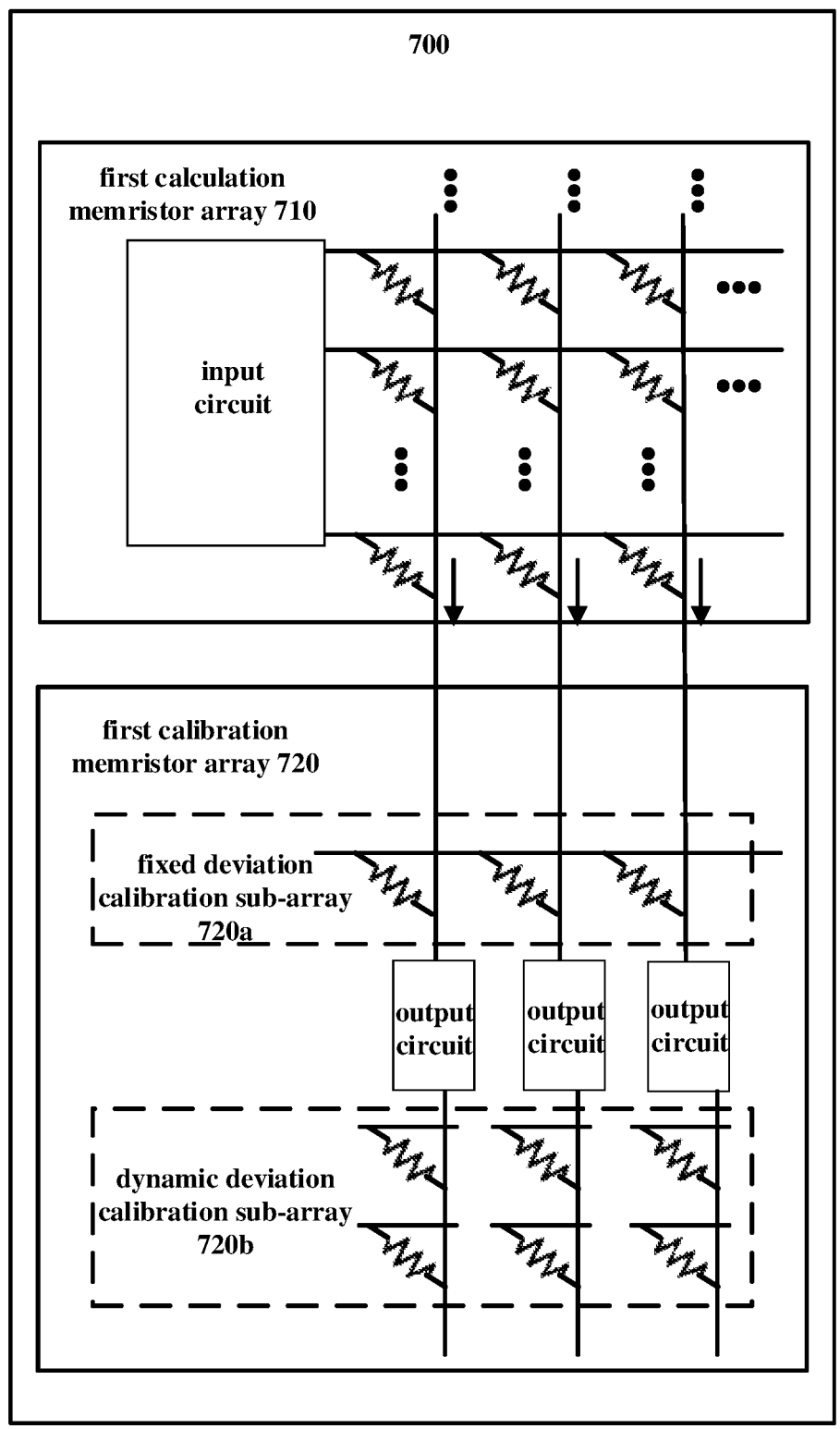
FIG. 7 is a schematic diagram of an example of a first processing element provided by an embodiment of the present disclosure.

For example, FIG. 7 is a schematic diagram of an example of a first processing element provided by an embodiment of the present disclosure. As illustrated by FIG. 7, the first processing element 700 includes a first calculation memristor array 710 and a first calibration memristor array 720. In FIG. 7, the first calibration memristor array 720 includes a fixed deviation calibration sub-array 720*a* and a dynamic deviation calibration sub-array 720*b*. The fixed deviation calibration sub-array 720*a* is configured to calibrate a fixed bias deviation, and the dynamic deviation calibration sub-array 720*b* is configured to calibrate a dynamic bias deviation. It should be noted that in the embodiment of the present disclosure, the first calibration memristor array 720 may include either or both of the fixed deviation calibration sub-array 720*a* and the dynamic deviation calibration sub-array 720*b*, and in the case where the first calibration memristor array 720 includes both of the fixed deviation calibration sub-array 720*a* and the dynamic deviation calibration sub-array 720*b*, either or both of the fixed deviation calibration sub-array 720*a* and the dynamic deviation calibration sub-array 720*b* may be used. For example, either or both of the fixed deviation calibration sub-array 720*a* and the dynamic deviation calibration sub-array 720*b* can be selected by a control mode of a switch (not illustrated by FIG. 7) to flexibly control the first calibration memristor array as required.

It should also be noted that a type of 1R (i.e., one resistor element) adopted by the memristor in FIG. 7 is only exemplary, and is not a limitation of the present disclosure, and the memristor can adopt different types according to the actual situation. For example, the memristor can also be of 1T1R (i.e., one resistor element plus one transistor) type.

It should also be noted that the dimension of the first calibration memristor array 720 in FIG. 7 is only an example, not a limitation of the present disclosure, and the dimension of the first calibration memristor array 720 can be determined according to the specific intelligent computing scenario and task and its accuracy requirements. Furthermore, in FIG. 7, the fixed deviation calibration sub-array 720*a* adopts an array expansion mode, and the dynamic deviation calibration sub-array 720*b* adopts an independent multi-column mode, which is also an example and is not a limitation of the present disclosure. The modes of the fixed deviation calibration sub-array 720*a* and the dynamic deviation calibration sub-array 720*b* can be determined according to specific circumstance.

For example, in one example of the embodiment of the present disclosure, the first calibration memristor array includes the fixed bias calibration sub-array (for example, the fixed bias calibration sub-array 720*a* illustrated by FIG. 7), the first training calibration input data includes a fixed training calibration input data, and the fixed bias calibration sub-array includes one row by N columns of memristor sub-circuits. In this case, inputting the first training calibration input data to the first calibration memristor array in step S622 includes inputting the fixed training calibration input data to the fixed deviation calibration sub-array.

For example, in another example of the embodiment of the present disclosure, the first calibration memristor array includes the dynamic deviation calibration sub-array (for example, the dynamic deviation calibration sub-array 720*b* illustrated by FIG. 7), the first training calibration input data includes a dynamic training calibration input data, and the dynamic deviation calibration sub-array includes at least one row by N columns of memristor sub-circuits. In this case, inputting the first training calibration input data to the first calibration memristor array in step S622 includes: determining the dynamic training calibration input data according to the first training calculation input data, and inputting the dynamic training calibration input data to the dynamic deviation calibration sub-array.

For example, in another example of the embodiment of the present disclosure, the first calibration memristor array includes the fixed deviation calibration sub-array and the dynamic deviation calibration sub-array (the fixed deviation calibration sub-array 720*a* and the dynamic deviation calibration sub-array 720*b* illustrated by FIG. 7), the first training calibration input data includes the fixed training calibration input data and the dynamic training calibration input data, the fixed deviation calibration sub-array includes one row by N columns of memristor sub-circuits, and the dynamic deviation calibration sub-array includes at least one row by N columns of memristor sub-circuits. In this case, inputting the first training calibration input data to the first calibration memristor array in step S622 includes: inputting the fixed training calibration input data to the fixed deviation calibration sub-array; determining the dynamic training calibration input data according to the first training calculation input data; and inputting the dynamic training calibration input data to the dynamic deviation calibration sub-array.

In the embodiment of the present disclosure, the fixed training calibration input data is the same for each of the N columns of the fixed deviation calibration sub-array.

For example, the fixed training calibration input data is a fixed bias voltage pulse.

For example, in the case that the first training calculation input data of each row of the first calculation memristor array is 0 or 1, the fixed training calibration input data can be fixed to 1 and does not change with the change of the first training calculation input data.

For example, considering that the deviation between the actual first output data and the ideal target output data is often relatively small, the fixed training calibration input data can be set to 5%-20% of a maximum value of the first training calculation input data. In this case, inputting the fixed training calibration input data to the fixed deviation calibration sub-array includes: inputting 5%-20% of the maximum value of the first training calculation input data to the fixed deviation calibration sub-array as the fixed training calibration input data.

In the embodiment of the present disclosure, the dynamic training calibration input data is dynamically determined and may be different for each of the N columns of the dynamic deviation calibration sub-array.

For example, in an example of the embodiment of the present disclosure, before on-chip training is performed on the first calibration memristor array based on the first calculation memristor array written with the first calculation weight matrix and the first calculation weight matrix to adjust the weight value of the first calibration memristor array, the calibration method further includes step S630a: determining at least one memristor sub-circuit in the i-th column of the first calculation memristor array at a key weight position, and setting an input of at least one memristor sub-circuit in the i-th column of the dynamic deviation calibration sub-array to be the same as an input of the at least one memristor sub-circuit in the i-th column of the first calculation memristor array at the key weight position. In this case, determining the dynamic training calibration input data according to the first training calculation input data including: taking the first training calculation input data of at least one memristor sub-circuit in the i-th column of the first calculation memristor array at the key weight position as the dynamic training calibration input data of at least one memristor sub-circuit in the i-th column of the dynamic deviation calibration sub-array.

For example, a proportion of the key weight position of each column in the first calculation memristor array can be determined according to the actual situation, and the key weight position of each column can be defined in the first calculation memristor array according to the determined proportion. For example, the weight of each column can be sorted according to a fluctuation degree and an influence degree of fluctuation on the result, and the corresponding position of the memristor with the highest influence degree can be selected as the key weight position of the column according to the determined proportion, and the key weight positions of columns in the first calculation memristor array may be different; at the same time, a number of the key weight position of each column of the first calculation memristor array is the same as a number of the weight sub-circuit accessed by each column of the dynamic deviation calibration sub-array. If the i-th column of the first calculation memristor array corresponds to the i-th column of the dynamic deviation calibration sub-array, the input of the key weight of the i-th column of the first calculation memristor array is shared with the input of each row of the i-th column of the dynamic deviation calibration sub-array, so as to determining the dynamic input of the i-th column of the dynamic deviation calibration sub-array, that is to say, the i-th column of the dynamic deviation calibration sub-array shares the first training calculation input data of the key weight position of the i-th column of the first calculation memristor array.

Figure 8:
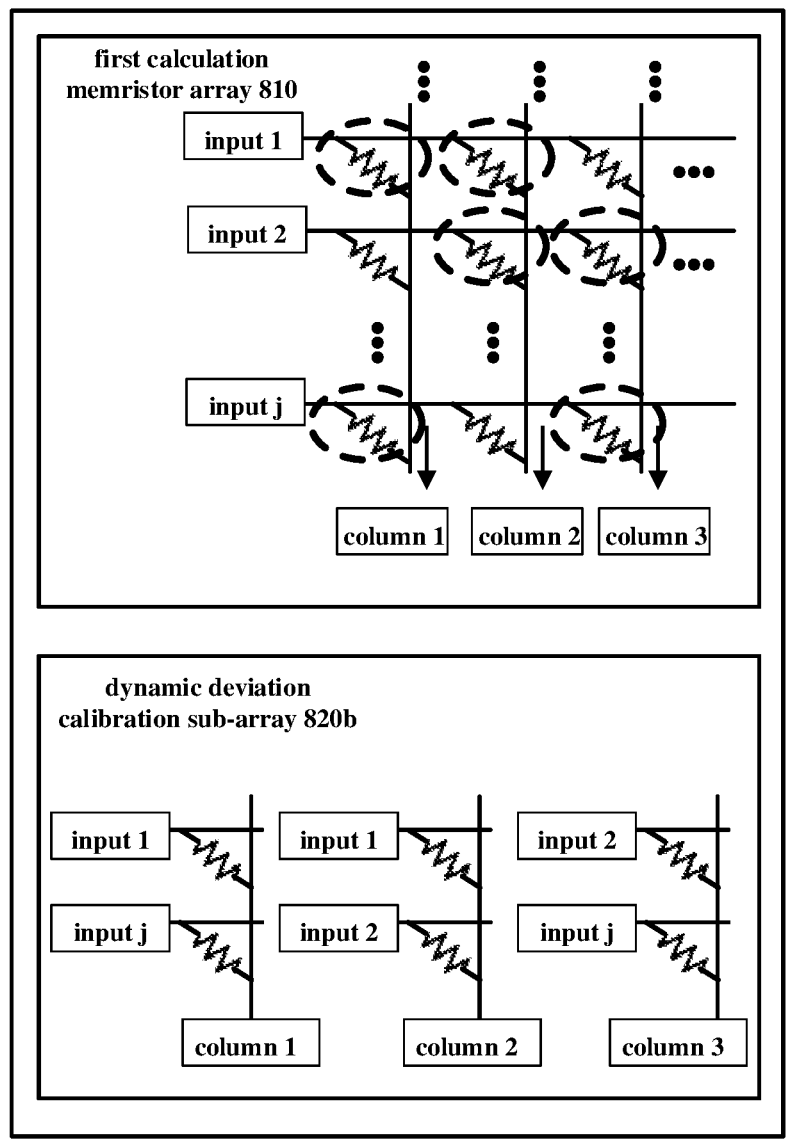
FIG. 8 is a schematic diagram of an example of dynamically determining dynamic training calibration input data provided by an embodiment of the present disclosure.

For example, FIG. 8 is a schematic diagram of an example of dynamically determining dynamic training calibration input data provided by an embodiment of the present disclosure. In the example illustrated by FIG. 8, determining that the number of the key weight positions in each column of the first calculation memristor array 810 is 2, and correspondingly, the dimension of the dynamic deviation calibration sub-array 820*b* is 2 rows. For example, in FIG. 8, determining that the memristor sub-circuits in the first row and the j-th row of the first column of the first calculation memristor array 810 are the memristor sub-circuits in the key weight positions, and respectively setting the inputs of the memristor sub-circuits in the first row and the second row of the first column of the dynamic deviation calibration sub-array 820*b* to be the same as the inputs of the memristor sub-circuits in the first column and the j-th row of the first column of the first calculation memristor array 810; determining that the memristor sub-circuits in the first row and the second row of the second column of the first calculation memristor array 810 are the memristor sub-circuits in the key weight positions, and respectively setting the inputs of the memristor sub-circuits in the first row and the second row of the second column of the dynamic deviation calibration sub-array 820*b* to be the same as the inputs of the memristor sub-circuits in the first column and the second row of the second column of the first calculation memristor array 810; determining that the memristor sub-circuits in the second row and the j-th row of the third column of the first calculation memristor array 810 are the memristor sub-circuits in the key weight positions, and respectively setting the inputs of the memristor sub-circuits in the first row and the second row of the third column of the dynamic deviation calibration sub-array 820*b* to be the same as the inputs of the memristor sub-circuits in the second row and the j-th row of the third column of the first calculation memristor array 810; and j is a positive integer greater than or equal to 2. In this way, the dynamic input of each column of the dynamic deviation calibration sub-array 820*b* can be determined, and the input of each column of the dynamic deviation calibration sub-array 820*b* shares the input of the key weight position of the corresponding column of the first calculation memristor array 810.

In the embodiment of the present disclosure, the dynamic deviation calibration sub-array can also adopt the array expansion mode. For example, in the case that the dynamic deviation calibration sub-array adopts the array expansion mode, the key weight position of the first calibration memristor array can be determined in units of rows.

For example, in another example of the embodiment of the present disclosure, before on-chip training is performed on the first calibration memristor array based on the first calculation memristor array written with the first calculation weight matrix and the first calculation weight matrix to adjust the weight value of the first calibration memristor array, the calibration method further includes step S630b: determining at least one row of the memristor sub-circuit of the first calculation memristor array at a key weight position, and setting an input of at least one row of the memristor sub-circuit of the dynamic deviation calibration sub-array to be the same as the input of the at least one row of the memristor sub-circuit of the first calculation memristor array at the key weight position. In this case, determining the dynamic training calibration input data according to the first training calculation input data including: taking the first training calculation input data of the at least one row of the memristor sub-circuit of the first calculation memristor array at the key weight position as the dynamic training calibration input data of the at least one row of the memristor sub-circuit in the dynamic deviation calibration sub-array.

In the embodiment of the present disclosure, all columns in the first calculation memristor array can be calibrated, or determining the column in the first calculation memristor array that need calibration, and only the column in the first calculation memristor array that need calibration can be calibrated to save the calculation amount of calibration.

For example, in the embodiment of the present disclosure, based on the first calculation memristor array written with the first calculation weight matrix and the first calculation weight matrix, performing on-chip training on the first calibration memristor array to adjust the weight value of the first calibration memristor array (step S620) further includes step S624: before inputting the first training calculation input data to the first calculation memristor array and inputting the first training calibration input data to the first calibration memristor array to obtain the first training calibration output data (step S622), inputting the first training calculation input data to the first calculation memristor array to obtain the first training output data; according to the deviation between the first training output data and the first training target output data, determining the column that need calibration in the first calculation memristor array, and connecting the memristor sub-circuit in the first calibration memristor array corresponding to the column that need calibration in series with the column that need calibration in the first calculation memristor array.

Figure 9A:
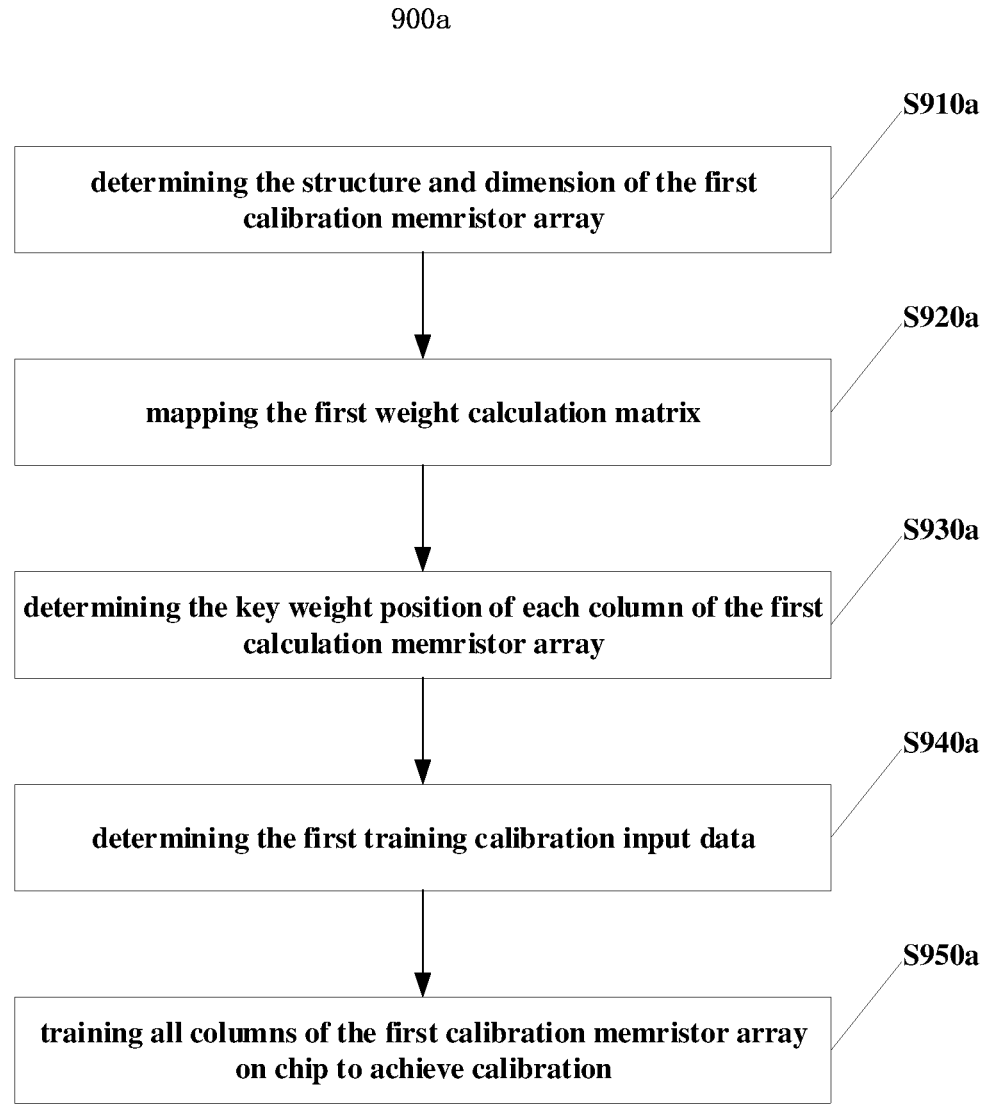
FIG. 9A is a flowchart of an example of a calibration method provided by at least one embodiment of the present disclosure.

For example, FIG. 9A is a flowchart of an example of a calibration method provided by at least one embodiment of the present disclosure, and a calibration method 900a includes steps S910a to S950a. As illustrated by FIG. 9A, at step S910a, determining the structure and dimension of the first calibration memristor array. Determining the structure of the first calibration memristor array means determining that the first calibration memristor array includes or selects either or both of the fixed deviation calibration sub-array and the dynamic deviation calibration sub-array, and determining the dimension of the first calibration memristor array means determining the number of rows and columns of the first calibration memristor array according to the calibration accuracy requirements. At step S920a, mapping the first weight calculation matrix, for example, the first weight calculation matrix is deployed and mapped to the first calculation memristor array of each processing element by a tool chain such as a compiler. At step S930a, determining the key weight position of each column of the first calculation memristor array, for example, the corresponding key weight position of each column are selected and located according to the determined proportion; at step S940a, determining the first training calibration input data, for example, the fixed training calibration input data is 5%-20% of the maximum value of the first training calculation input data, and the input of different rows of each column of the dynamic deviation calibration sub-array and the input of the key weight position of the corresponding column of the first calculation memristor array are shared in real time; at step S950a, training all columns of the first calibration memristor array on chip to achieve calibration. For example, by using the method of linear regression, the weight values of the fixed deviation calibration sub-array and the dynamic deviation calibration sub-array are trained and adjusted on chip until the deviation between the actual first output data and the ideal target output data reaches an appropriate interval or the on-chip training reaches the maximum number of iterative processes. In this example, the column in the first calculation memristor array that need calibration are not determined in advance, and all columns in the first calculation memristor array are calibrated.

Figure 9B:
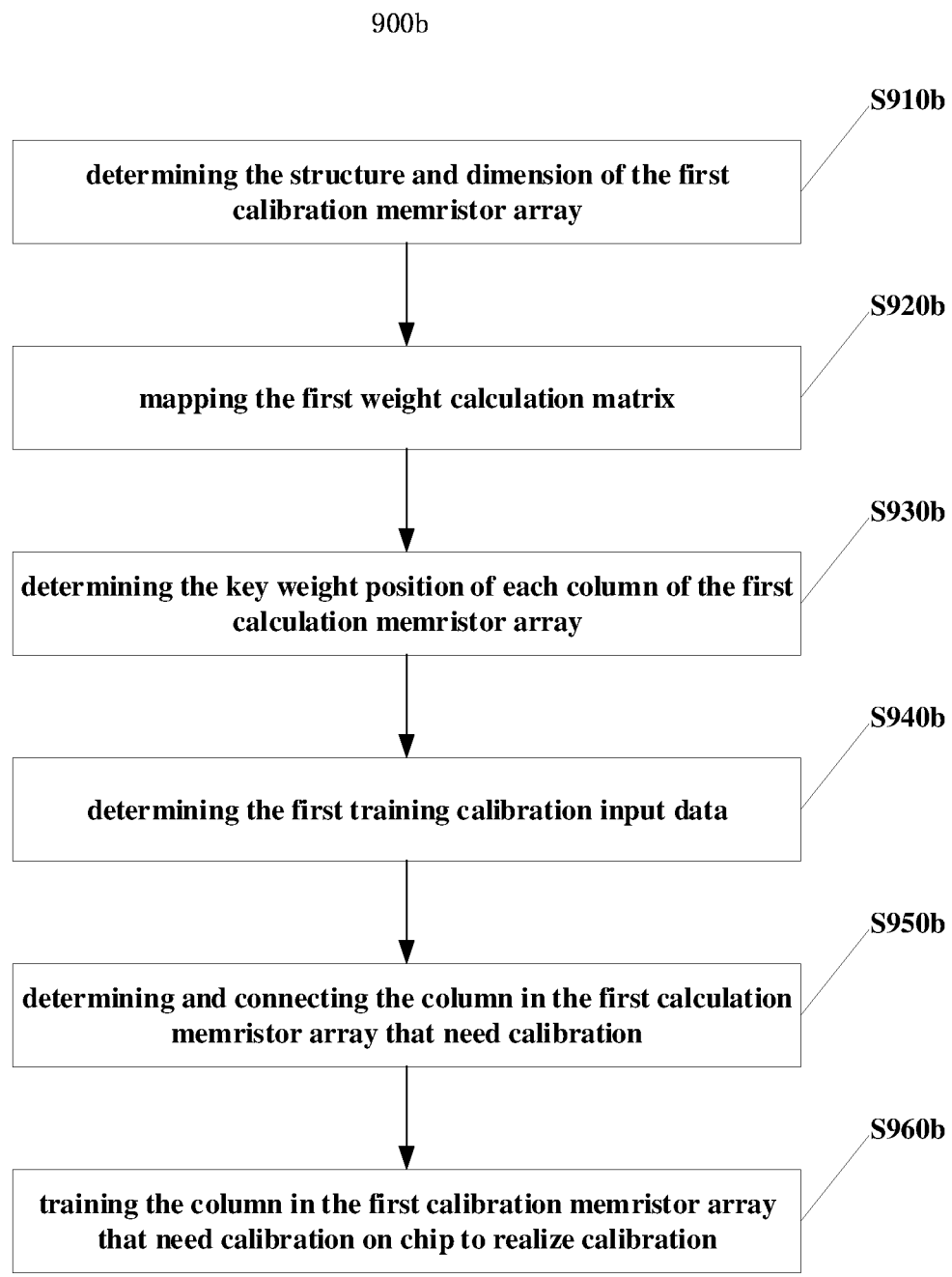
FIG. 9B is a flowchart of another example of the calibration method provided by at least one embodiment of the present disclosure.

For example, FIG. 9B is a flowchart of another example of the calibration method provided by at least one embodiment of the present disclosure, and a calibration method 900b includes steps S910b to S960b. As illustrated by FIG. 9B, at step S910b, determining the structure and dimension of the first calibration memristor array. Determining the structure of the first calibration memristor array means determining that the first calibration memristor array includes or selects either or both of the fixed deviation calibration sub-array and the dynamic deviation calibration sub-array, and determining the dimension of the first calibration memristor array means determining the number of rows and columns of the first calibration memristor array according to the calibration accuracy requirements. At step S920b, mapping the first weight calculation matrix, for example, the first weight calculation matrix is deployed and mapped to the first calculation memristor array of each processing element by a tool chain such as a compiler. At step S930b, determining the key weight position of each column of the first calculation memristor array, for example, the corresponding key weight position of each column are selected and located according to the determined proportion; at step S940b, determining the first training calibration input data, for example, the fixed training calibration input data is 5%-20% of the maximum value of the first training calculation input data, and the input of different rows of each column of the dynamic deviation calibration sub-array and the input of the key weight position of the corresponding column of the first calculation memristor array are shared in real time; at step S950b, determining and connecting the column in the first calculation memristor array that need calibration, for example, determining and connecting the column in the first calculation memristor array that need calibration as described in step S624; at step S960b, training the column in the first calibration memristor array that need calibration on chip to realize calibration, for example, by using linear regression method, the weight values of the fixed deviation calibration sub-array and the dynamic deviation calibration sub-array are trained and adjusted on chip until the deviation between the actual first output data and the ideal target output data reaches an appropriate interval or the on-chip training reaches the maximum number of iterative processes. In this example, the columns in the first calculation memristor array that need calibration are determined in advance, and only the column in the first calculation memristor array that need calibration are calibrated.

In the embodiment of the present disclosure, the memory computing integrated device includes the plurality of processing elements. For example, the memory computing integrated device further comprises a second processing element, which comprises a second calculation memristor array and a second calibration memristor array, and the second calculation memristor array is configured to receive a second calculation input data determined according to the first calibration output data and calculate the second calculation input data to obtain a second output data; the second calibration memristor array is configured to receive the second calibration input data and calibrate the second output data according to the second calibration input data to obtain a second calibration output data; the second processing element is configured to output the second calibration output data; the calibration method further includes determining a second calculation weight matrix corresponding to the second calculation memristor array through off-chip training, and writing the second calculation weight matrix into the second calculation memristor array; based on the second calculation memristor array written with the second calculation weight matrix and the second calculation weight matrix, performing on-chip training on the second calibration memristor array to adjust a weight value of the second calibration memristor array.

It should be noted that a plurality of calibration sequences can be adopted for the plurality of processing elements included in the memory computing integrated device, and the embodiment of the present disclosure does not limit thereto. For example, the plurality of processing elements can perform calibration independently and in parallel. For example, the plurality of processing elements can also be calibrated step by step.

For example, in the embodiment of the present disclosure, the second processing element is coupled with the first processing element, and in the process of on-chip training the second calibration memristor array based on the second calculation memristor array written with the second calculation weight matrix and the second calculation weight matrix to adjust the weight value of the second calibration memristor array, determining the first training target output data according to the first training calculation input data and the first calculation weight matrix, and taking the first training target output data as the second training input data of the second calculation memristor array, or, under the condition that the first calibration memristor array is trained, inputting the first training calculation input data to the first calculation memristor array, inputting the first training calibration input data to the first calibration memristor array to obtain the first training calibration output data, and taking the first training calibration output data as the second training input data of the second calculation memristor array.

Figure 10A:
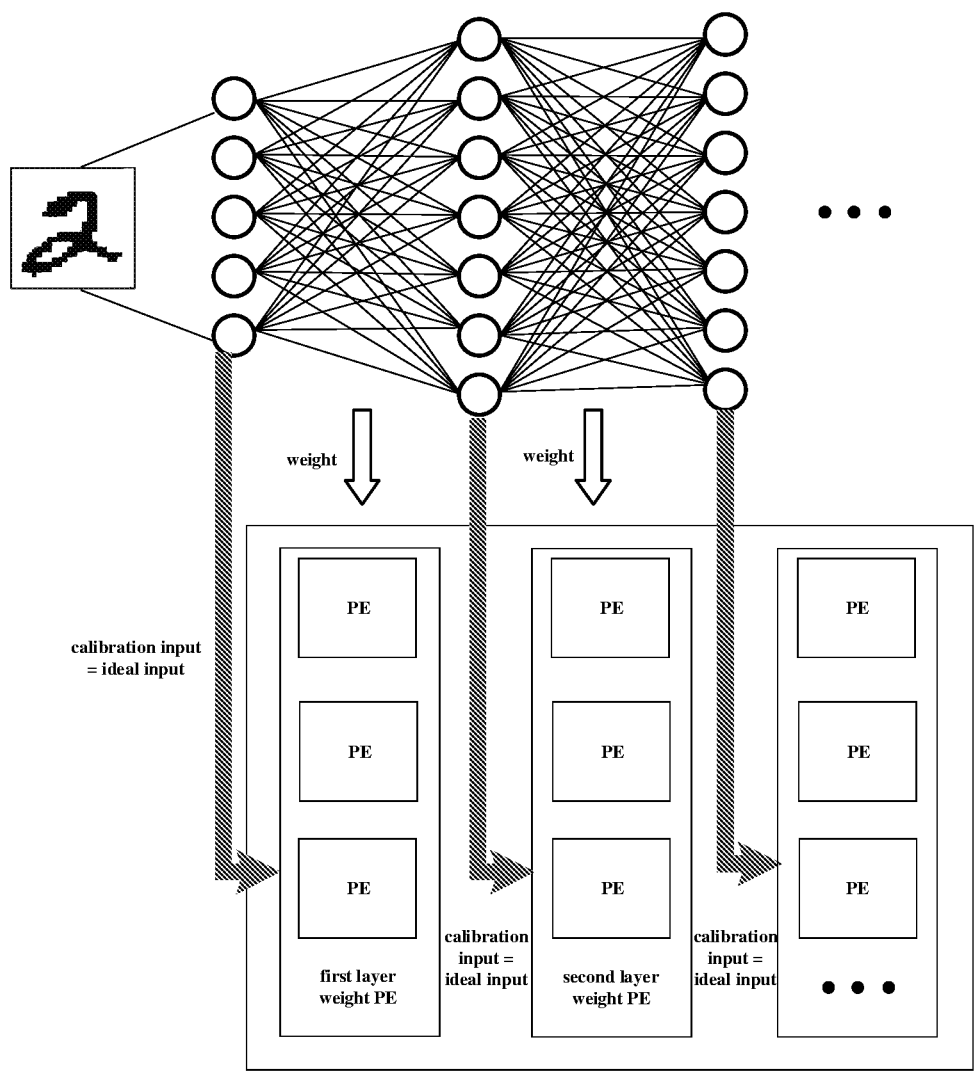
FIG. 10A is a schematic diagram of an independent parallel calibration method provided by at least one embodiment of the present disclosure.

For example, FIG. 10A is a schematic diagram of an independent parallel calibration method provided by at least one embodiment of the present disclosure. As illustrated by FIG. 10A, when the calculation weight matrix of each processing element is divided and deployed in a compilation stage, the ideal calculation input data of each processing element is determined, and the training calculation input data of each processing element are respectively constructed by using the ideal calculation input data of each processing element, so that each processing element can be calibrated independently and in parallel.

Figure 10B:
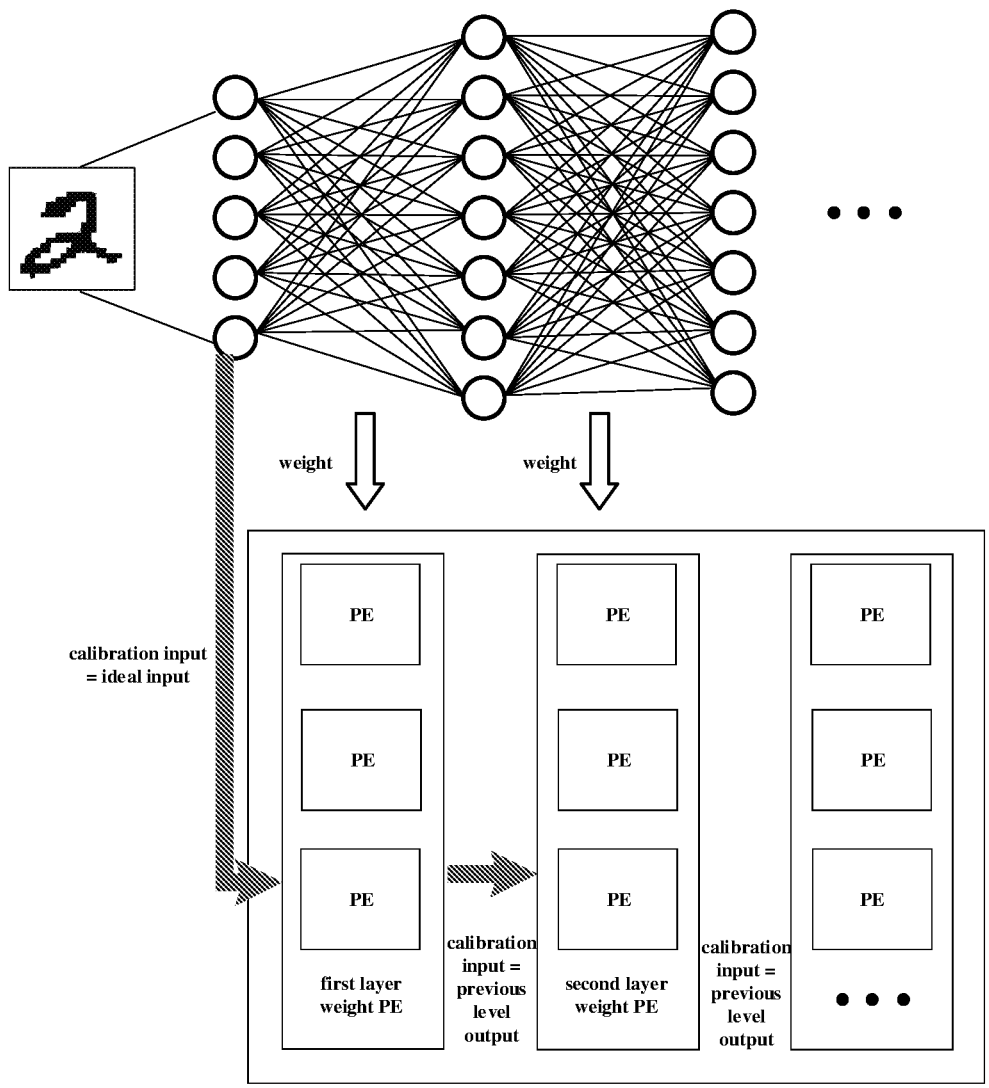
FIG. 10B is a schematic diagram of a step-by-step calibration method provided by at least one embodiment of the present disclosure.

For example, FIG. 10B is a schematic diagram of a step-by-step calibration method provided by at least one embodiment of the present disclosure. As illustrated by FIG. 10B, a level of each processing element in the plurality of processing elements is correspondingly divided according to a layer to which the weight belong during deep learning, and a first-stage processing element performs calibration first, and the corresponding input is the training calculation input data constructed by using the ideal calculation input data of the first-stage processing element; the output of the calibrated first-stage processing element under the training calculation input data constructed by using the ideal calculation input data is used as the input of the next-stage processing element, and the next-stage processing element is calibrated, the rest may be inferred.

In the example illustrated by FIG. 10A, the calibration input of each processing element is based on the ideal calculation input data confirmed in the compilation stage. However, in the example illustrated by FIG. 10B, the calibration input of each processing element (except the first-stage processing element) is based on the actual output of the previous processing element after calibration (which may be different from the ideal calculation input data in the compilation stage). Comparatively, the solution illustrated by FIG. 10B is more complicated, but it has better error adaptability and higher system calibration accuracy.

To sum up, the present disclosure proposes the middle-level and medium-grained calibration method for simulation domain calculation results, and designs a supporting architecture and operation flow. According to the above-mentioned various embodiments and examples, the calibration method proposed in the present disclosure can realize the calibration at the processing element level and ensure the accuracy of the analog domain calculation result of each processing element, thus ensuring the normal operation of the system including multiple processing elements, with good reliability and universality. In addition, because there is no need to calibrate each component at the bottom, the additional overhead introduced is low, which has the advantages of high efficiency and low cost; because only the weight value of the first calibration memristor array is calibrated, the hardware overhead can be flexibly configured according to the requirements of calibration accuracy, and the on-demand design can be realized. Therefore, the calibration method proposed in the present disclosure solves the key bottleneck of the development of the memory computing integrated system, and is the core breakthrough of the memory computing integrated technology of memristors towards the practical application stage.

The memory computing integrated device provided by at least one embodiment of the present disclosure includes the first processing element including the first calculation memristor array and the first calibration memristor array, the first calculation memristor array is configured to receive the first calculation input data and calculate the first calculation input data to obtain the first output data; the first calibration memristor array is configured to receive the first calibration input data and calibrate the first output data according to the first calibration input data to obtain the first calibration output data; the first processing element is configured to output the first calibration output data. For example, the first processing element may refer to the related description of the first processing element 500, which is not repeated here.

For example, in the memory computing integrated device provided by at least one embodiment of the present disclosure, the first calculation memristor array includes M rows by N columns of memristor sub-circuits, the first calibration memristor array includes K rows by N columns of memristor sub-circuits, the i-th column of the first calibration memristor array is connected in series with the i-th column of the first calculation memristor array, the memristor sub-circuit of the i-th column of the first calibration memristor array is configured to calibrate the first output data of the i-th column of the first calculation memristor array according to the first calibration input data to obtain the first calibration output data of the i-th column, M, N, K and i are all positive integers, and $1 \le i \le N$. For example, the first processing element may refer to the related description of the first processing element 500, which is not repeated here.

For example, in the memory computing integrated device provided by at least one embodiment of the present disclosure, the first calibration memristor array includes the fixed deviation calibration sub-array, the first calibration input data includes the fixed calibration input data, the fixed deviation calibration sub-array includes one row by N columns of memristor sub-circuits, the i-th column of the fixed deviation calibration sub-array is connected in series with the i-th column of the first calculation memristor array, and the memristor sub-circuit in the i-th column of the fixed deviation calibration sub-array is configured to calibrate the first output data of the i-th column of the first calculation memristor array according to the fixed calibration input data. For example, the fixed deviation calibration sub-array can refer to the related description of the fixed deviation calibration sub-array 720a, which is not repeated here.

For example, in the memory computing integrated device provided by at least one embodiment of the present disclosure, the first calibration memristor array includes the dynamic deviation calibration sub-array, the first calibration input data includes a dynamic calibration input data, and the dynamic deviation calibration sub-array includes at least one row by N columns of memristor sub-circuits, and the i-th column of the dynamic deviation calibration sub-array is connected in series with the i-th column of the first calculation memristor array. The dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, and the at least one memristor sub-circuit in the i-th column of the dynamic deviation calibration sub-array is configured to calibrate the first output data of the i-th column of the first calculation memristor array according to the dynamic calibration input data corresponding to the at least one memristor sub-circuit in the i-th column of the dynamic deviation calibration sub-array, so as to obtain the first calibration output data of the i-th column. For example, the dynamic deviation calibration sub-array can refer to the relevant description of the dynamic deviation calibration sub-array 720b, which is not described here.

For example, in the memory computing integrated device provided by at least one embodiment of the present disclosure, the first calibration memristor array includes the fixed deviation calibration sub-array and the dynamic deviation calibration sub-array, the first calibration input data includes the fixed calibration input data and the dynamic calibration input data, the fixed deviation calibration sub-array includes one row by N columns of memristor sub-circuits, and the dynamic deviation calibration sub-array includes at least one row by N columns of memristor sub-circuits. The i-th column of the fixed deviation calibration sub-array and the i-th column of the dynamic deviation calibration sub-array are connected in series with the i-th column of the first calculation memristor array, and the dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, the memristor sub-circuit of the i-th column of the fixed deviation calibration sub-array and the at least one memristor sub-circuit of the i-th column of the dynamic deviation calibration sub-array are configured to calibrate the first output data of the i-th column of the first calculation memristor array according to the fixed calibration input data and the dynamic calibration input data corresponding to the at least one memristor sub-circuit of the i-th column of the dynamic deviation calibration sub-array respectively, so as to obtain the first calibration output data of the i-th column. For example, the fixed deviation calibration sub-array can refer to the relevant description of the fixed deviation calibration sub-array 720a, and the dynamic deviation calibration sub-array can refer to the relevant description of the dynamic deviation calibration sub-array 720b, which will not be described here again.

For example, in the memory computing integrated device provided by at least one embodiment of the present disclosure, the fixed calibration input data is 5%-20% of the maximum value of the first calculation input data.

For example, in the memory computing integrated device provided by at least one embodiment of the present disclosure, the dynamic calibration input data corresponding to the at least one memristor sub-circuit in the i-th column of the dynamic deviation calibration sub-array is the same as the first calculation input data corresponding to the at least one memristor sub-circuit in the i-th column of the first calculation memristor array at the key weight position. For example, the dynamic deviation calibration sub-array can refer to the relevant description of the dynamic deviation calibration sub-array 820b, and the configuration of the dynamic calibration input data can refer to the relevant description of step S630a, which is not repeated here.

For example, in the memory computing integrated device provided by at least one embodiment of the present disclosure, the dynamic calibration input data corresponding to at least one row of memristor sub-circuit in the dynamic deviation calibration sub-array is the same as the first calculation input data corresponding to at least one row of memristor sub-circuit in the first calculation memristor array at the key weight position. For example, the configuration of dynamic calibration input data can refer to the related description of step S630b, which is not repeated here.

It should be noted that, for the sake of clarity and conciseness, the embodiment of the present disclosure does not give all constituent circuits of the memory computing integrated device, nor all the constituent circuits of the processing element included in the memory computing integrated device. In order to realize the necessary functions of the memory computing integrated device and the processing element included in it, the skilled person can provide and set other unillustrated constituent circuits according to the specific needs, and the embodiment of the present disclosure does not limit thereto.

For the technical effect of the memory computing integrated device and the processing element included therein in different embodiments, please refer to the technical effect of the calibration method of the memory computing integrated device provided in the embodiment of the present disclosure, which will not be described in detail here.

The following points need to be explained:
(1) In the drawings of the embodiments of the present disclosure, only the structures related to the embodiments of the present disclosure are involved, and other structures can refer to the general design.
(2) The features of the same embodiment and different embodiments of the present disclosure can be combined with each other without conflict.

The above are only the specific embodiments of this disclosure, but the scope of protection of the present disclosure is not limited thereto. Therefore, the scope of protection of the present disclosure should be based on the scope of protection of the claims.

The invention claimed is:
1. A calibration method of a memory computing integrated device,
wherein the memory computing integrated device comprises a first processing element, the first processing element comprises a first calculation memristor array and a first calibration memristor array, and the first calculation memristor array is configured to receive a first calculation input data and calculate the first calculation input data to obtain a first output data; the first calibration memristor array is configured to receive a first calibration input data and calibrate the first output data according to the first calibration input data to obtain a first calibration output data; the first processing element is configured to output the first calibration output data, the calibration method comprises:

determining a first calculation weight matrix corresponding to the first calculation memristor array through off-chip training, and writing the first calculation weight matrix into the first calculation memristor array;

based on the first calculation memristor array written with the first calculation weight matrix and the first calculation weight matrix, performing on-chip training on the first calibration memristor array to adjust a weight value of the first calibration memristor array.

2. The calibration method according to claim 1, wherein the first calculation memristor array comprises M rows by N columns of memristor sub-circuits, the first calibration memristor array comprises K rows by N columns of memristor sub-circuits, the i-th column of the first calibration memristor array is connected in series with the i-th column of the first calculation memristor array, a memristor sub-circuit of the i-th column of the first calibration memristor array is configured to calibrate the first output data of the i-th column of the first calculation memristor array according to the first calibration input data to obtain the first calibration output data of the i-th column, M, N, K and i are all positive integers, and 1≤i≤N, based on the first calculation memristor array written with the first calculation weight matrix and the first calculation weight matrix, performing on-chip training on the first calibration memristor array to adjust the weight value of the first calibration memristor array comprises:

determining a first training target output data according to a first training calculation input data and the first calculation weight matrix;

inputting the first training calculation input data to the first calculation memristor array and inputting a first training calibration input data to the first calibration memristor array to obtain a first training calibration output data;

according to a deviation between the first training calibration output data and the first training target output data, adjust the weight value of the memristor sub-circuit in the first calibration memristor array corresponding to a column that need calibration in the first calculation memristor array.

3. The calibration method according to claim 2, wherein the first calibration memristor array comprises a fixed bias calibration sub-array, the first training calibration input data comprises a fixed training calibration input data, and the fixed bias calibration sub-array comprises one row by N columns of memristor sub-circuits, inputting the first training calibration input data to the first calibration memristor array comprises: inputting the fixed training calibration input data to the fixed deviation calibration sub-array.

4. The calibration method according to claim 3, wherein inputting the fixed training calibration input data to the fixed deviation calibration sub-array comprises: inputting 5%-20% of a maximum value of the first training calculation input data to the fixed deviation calibration sub-array as the fixed training calibration input data.

5. The calibration method according to claim 2, wherein the first calibration memristor array comprises a dynamic deviation calibration sub-array, the first training calibration input data comprises a dynamic training calibration input data, and the dynamic deviation calibration sub-array comprises at least one row by N columns of memristor sub-circuits, inputting the first training calibration input data to the first calibration memristor array comprises: determining the dynamic training calibration input data according to the first training calculation input data, and inputting the dynamic training calibration input data to the dynamic deviation calibration sub-array.

6. The calibration method according to claim 5, wherein before performing on-chip training on the first calibration memristor array based on the first calculation memristor array written with the first calculation weight matrix and the first calculation weight matrix to adjust the weight value of the first calibration memristor array, the calibration method further comprises:

determining at least one memristor sub-circuit in the i-th column of the first calculation memristor array at a key weight position, and setting an input of at least one memristor sub-circuit in the i-th column of the dynamic deviation calibration sub-array to be the same as an input of the at least one memristor sub-circuit in the i-th column of the first calculation memristor array at the key weight position, wherein determining the dynamic training calibration input data according to the first training calculation input data comprises:

taking the first training calculation input data of the at least one memristor sub-circuit in the i-th column of the first calculation memristor array at the key weight position as the dynamic training calibration input data of at least one memristor sub-circuit in the i-th column of the dynamic deviation calibration sub-array.

7. The calibration method according to claim 5, wherein before performing on-chip training on the first calibration memristor array based on the first calculation memristor array written with the first calculation weight matrix and the first calculation weight matrix to adjust the weight value of the first calibration memristor array, the calibration method further comprises:

determining at least one row of the memristor sub-circuit of the first calculation memristor array at a key weight position, and setting an input of at least one row of the memristor sub-circuit of the dynamic deviation calibration sub-array to be the same as an input of the at least one row of the memristor sub-circuit of the first calculation memristor array at the key weight position, wherein determining the dynamic training calibration input data according to the first training calculation input data comprises:

taking the first training calculation input data of the at least one row of the memristor sub-circuit of the first calculation memristor array at the key weight position as the dynamic training calibration input data of at least one row of the memristor sub-circuit in the dynamic deviation calibration sub-array.

8. The calibration method according to claim 2, wherein the first calibration memristor array comprises a fixed deviation calibration sub-array and a dynamic deviation calibration sub-array, the first training calibration input data comprises a fixed training calibration input data and a dynamic training calibration input data, the fixed deviation calibration sub-array comprises one row by N columns of memristor sub-circuits, and the dynamic deviation calibration sub-array comprises at least one row by N columns of memristor sub-circuits, inputting the first training calibration input data to the first calibration memristor array comprises:

inputting the fixed training calibration input data to the fixed deviation calibration sub-array;

determining the dynamic training calibration input data according to the first training calibration input data; and inputting the dynamic training calibration input data to the dynamic deviation calibration sub-array.

9. The calibration method according to claim 2, wherein based on the first calculation memristor array written with the first calculation weight matrix and the first calculation weight matrix, performing on-chip training on the first calibration memristor array to adjust the weight value of the first calibration memristor array further comprises:

before inputting the first training calculation input data to the first calculation memristor array and inputting the first training calibration input data to the first calibration memristor array to obtain the first training calibration output data, inputting the first training calculation input data to the first calculation memristor array to obtain the first training output data;

according to the deviation between the first training output data and the first training target output data, determining the column that need calibration in the first calculation memristor array, and connecting the memristor sub-circuit in the first calibration memristor array corresponding to the column that need calibration in series with the column that need calibration in the first calculation memristor array.

10. The calibration method according to claim 1, wherein the memory computing integrated device further comprises a second processing element, the second processing element comprises a second calculation memristor array and a second calibration memristor array, and the second calculation memristor array is configured to receive a second calculation input data determined according to the first calibration output data and calculate the second calculation input data to obtain a second output data; the second calibration memristor array is configured to receive the second calibration input data and calibrate the second output data according to the second calibration input data to obtain a second calibration output data; the second processing element is configured to output the second calibration output data;

the calibration method further comprises:

determining a second calculation weight matrix corresponding to the second calculation memristor array through off-chip training, and writing the second calculation weight matrix into the second calculation memristor array;

based on the second calculation memristor array written with the second calculation weight matrix and the second calculation weight matrix, performing on-chip training on the second calibration memristor array to adjust a weight value of the second calibration memristor array.

11. The calibration method according to claim 10, wherein the second processing element is coupled with the first processing element, in the process of on-chip training the second calibration memristor array based on the second calculation memristor array written with the second calculation weight matrix and the second calculation weight matrix to adjust the weight value of the second calibration memristor array, determining the first training target output data according to the first training calculation input data and the first calculation weight matrix, and taking the first training target output data as the second training input data of the second calculation memristor array, or, under the condition that the first calibration memristor array is trained, inputting the first training calculation input data to the first calculation memristor array, inputting the first training calibration input data to the first calibration memristor array to obtain the first training calibration output data, and taking the first training calibration output data as the second training input data of the second calculation memristor array.

12. The calibration method according to claim 1, wherein each memristor sub-circuit in the first calibration memristor array is configured to realize both positive weight and negative weight.

13. A memory computing integrated device, comprising a first processing element, wherein the first processing element comprises a first calculation memristor array and a first calibration memristor array, the first calculation memristor array is configured to receive a first calculation input data and calculate the first calculation input data to obtain a first output data;

the first calibration memristor array is configured to receive a first calibration input data and calibrate the first output data according to the first calibration input data to obtain a first calibration output data;

the first processing element is configured to output the first calibration output data.

14. The device according to claim 13, wherein the first calculation memristor array comprises M rows by N columns of memristor sub-circuits, the first calibration memristor array comprises K rows by N columns of memristor sub-circuits, the i-th column of the first calibration memristor array is connected in series with the i-th column of the first calculation memristor array, the memristor sub-circuit of the i-th column of the first calibration memristor array is configured to calibrate the first output data of the i-th column of the first calculation memristor array according to the first calibration input data to obtain the first calibration output data of the i-th column, wherein M, N, K and i are all positive integers, and $1 \leq i \leq N$.

15. The device according to claim 14, wherein the first calibration memristor array comprises a fixed deviation calibration sub-array, the first calibration input data comprises a fixed calibration input data, the fixed deviation calibration sub-array comprises one row by N columns of memristor sub-circuits, the i-th column of the fixed deviation calibration sub-array is connected in series with the i-th column of the first calculation memristor array, the memristor sub-circuit in the i-th column of the fixed deviation calibration sub-array is configured to calibrate the first output data of the i-th column of the first calculation memristor array according to the fixed calibration input data to obtain the first calibration output data of the i-th column.

16. The device according to claim 15, wherein the fixed calibration input data is 5%-20% of a maximum value of the first calculation input data.

17. The device according to claim 14, wherein the first calibration memristor array comprises a dynamic deviation calibration sub-array, the first calibration input data comprises a dynamic calibration input data, and the dynamic deviation calibration sub-array comprises at least one row by N columns of memristor sub-circuits, and the i-th column of the dynamic deviation calibration sub-array is connected in series with the i-th column of the first calculation memristor array, the dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, the at least one memristor sub-circuit in the i-th column of the dynamic deviation calibration sub-array is configured to calibrate the first output data of the i-th column of the first calculation memristor array according to the dynamic calibration input data corresponding to the at least one memristor sub-circuit in the i-th column of the dynamic deviation calibration sub-array to obtain the first calibration output data of the i-th column.

18. The device according to claim 17, wherein the dynamic calibration input data corresponding to the at least one memristor sub-circuit in the i-th column of the dynamic deviation calibration sub-array is the same as the first calculation input data corresponding to the at least one memristor sub-circuit in the i-th column of the first calculation memristor array at the key weight position.

19. The device according to claim 17, wherein the dynamic calibration input data corresponding to at least one row of memristor sub-circuit in the dynamic deviation calibration sub-array is the same as the first calculation input data corresponding to at least one row of memristor sub-circuit in the first calculation memristor array at the key weight position.

20. The device according to claim 14, wherein the first calibration memristor array comprises a fixed deviation calibration sub-array and a dynamic deviation calibration sub-array, the first calibration input data comprises a fixed calibration input data and a dynamic calibration input data, the fixed deviation calibration sub-array comprises one row by N columns of memristor sub-circuits, and the dynamic deviation calibration sub-array comprises at least one row by N columns of memristor sub-circuits, the i-th column of the fixed deviation calibration sub-array and the i-th column of the dynamic deviation calibration sub-array are connected in series with the i-th column of the first calculation memristor array, the dynamic calibration input data corresponding to at least one memristor sub-circuit in the i-th column of the dynamic deviation calibration sub-array is determined according to the first calculation input data corresponding to M memristor sub-circuits in the i-th column of the first calculation memristor array, the memristor sub-circuit of the i-th column of the fixed deviation calibration sub-array and the at least one memristor sub-circuit of the i-th column of the dynamic deviation calibration sub-array are configured to calibrate the first output data of the i-th column of the first calculation memristor array according to the fixed calibration input data and the dynamic calibration input data corresponding to the at least one memristor sub-circuit of the i-th column of the dynamic deviation calibration sub-array respectively, so as to obtain the first calibration output data of the i-th column.

\* \* \* \* \*